United States Patent
Bohne

(10) Patent No.: US 12,203,873 B2
(45) Date of Patent: Jan. 21, 2025

(54) SYSTEM AND METHOD FOR INSPECTING FUSED PLASTIC PIPES

(71) Applicant: WorldWide Nondestructive Testing, Inc, Brooksville, FL (US)

(72) Inventor: Kevin P. Bohne, Dade City, FL (US)

(73) Assignee: WorldWide Nondestructive Testing, Inc., Brooksville, FL (US)

( * ) Notice: Subject to any disclaimer, the term of this patent is extended or adjusted under 35 U.S.C. 154(b) by 252 days.

(21) Appl. No.: 17/884,663

(22) Filed: Aug. 10, 2022

(65) Prior Publication Data

US 2022/0381701 A1     Dec. 1, 2022

Related U.S. Application Data

(63) Continuation-in-part of application No. 16/504,825, filed on Jul. 8, 2019, now Pat. No. 11,448,604.

(51) Int. Cl.
| | |
|---|---|
| *G01N 21/952* | (2006.01) |
| *B29C 65/82* | (2006.01) |
| *B29L 23/00* | (2006.01) |
| *G01N 23/18* | (2018.01) |

(52) U.S. Cl.
CPC ....... *G01N 21/952* (2013.01); *B29C 65/8253* (2013.01); *G01N 23/18* (2013.01); *B29L 2023/22* (2013.01); *G01N 2223/628* (2013.01); *G01N 2223/646* (2013.01)

(58) Field of Classification Search
CPC ............ B29C 65/8253; B29L 2023/22; G01N 21/952; G01N 2223/623; G01N 2223/628; G01N 2223/629; G01N 2223/646; G01N 23/18
See application file for complete search history.

(56) References Cited

U.S. PATENT DOCUMENTS

| | | | | |
|---|---|---|---|---|
| 2,739,829 | A | * | 3/1956 | Cundiff ............. B29C 66/52292 285/294.1 |
| 4,078,180 | A | * | 3/1978 | Green .................. G01N 23/043 378/162 |
| 4,352,708 | A | * | 10/1982 | McElroy ............. B29C 65/7802 156/499 |

(Continued)

OTHER PUBLICATIONS

Standard Practice for Heat Fusion Joining of Polyethylene Pipe and Fittings, ASTM Designation: F2620-13 (c) May 22, 2017.

*Primary Examiner* — Dani Fox
*Assistant Examiner* — Soorena Kefayati
(74) *Attorney, Agent, or Firm* — Larson & Larson; Frank Liebenow; Justin P. Miller

(57) ABSTRACT

A method and apparatus for testing a fuse between plastic pipes within a fusion socket performed in the field includes a source of X-ray radiation and a scanning plate that has pixels that change state when exposed to this radiation. The source of the X-ray radiation is positioned on one side of the fuse and the scanning plate is positioned on another side so that the x-ray radiation passes through the fuse. After exposure, the x-ray image from the scanning plate is analyzed visually or algorithmically to find internal voids, weak fuses, and evidence of movement after the plastic of the fitting/pipes melted and flowed together. With such, the quality of the fitting is evident without cutting or otherwise destroying the fitting and, therefore, only weak or otherwise compromised fittings need be cut and redone.

20 Claims, 18 Drawing Sheets

(56) References Cited

U.S. PATENT DOCUMENTS

| | | | | |
|---|---|---|---|---|
| 4,955,740 A * | 9/1990 | Renz | G01N 23/18 | |
| | | | 156/276 | |
| 5,113,422 A * | 5/1992 | Pinder | G01N 23/083 | |
| | | | 378/207 | |
| 5,182,775 A * | 1/1993 | Matsui | G01N 23/18 | |
| | | | 706/912 | |
| 5,268,952 A * | 12/1993 | Tarvainen | G01N 23/16 | |
| | | | 378/58 | |
| 5,420,427 A * | 5/1995 | Morgan | G01N 23/18 | |
| | | | 250/358.1 | |
| 7,212,607 B1 * | 5/2007 | Rao | G01N 23/18 | |
| | | | 378/58 | |
| 8,569,436 B2 | 10/2013 | Smith et al. | | |
| 9,128,197 B2 | 9/2015 | Mair | | |
| 9,683,949 B2 | 6/2017 | Lee et al. | | |
| 10,096,148 B1 | 10/2018 | Case et al. | | |
| D846,593 S | 4/2019 | Anzures et al. | | |
| 2010/0272240 A1 * | 10/2010 | Cochrane | G01N 23/04 | |
| | | | 374/4 | |
| 2013/0056130 A1 * | 3/2013 | Alpert | B29C 66/1222 | |
| | | | 156/64 | |
| 2013/0181136 A1 * | 7/2013 | Venkatachalam | G01T 1/20 | |
| | | | 250/361 R | |
| 2013/0193338 A1 * | 8/2013 | Wuestenbecker | G01N 23/18 | |
| | | | 250/506.1 | |
| 2014/0070104 A1 * | 3/2014 | Mair | G01T 1/2012 | |
| | | | 250/363.01 | |
| 2014/0146942 A1 * | 5/2014 | Tahtali | G01N 23/046 | |
| | | | 378/62 | |
| 2015/0235357 A1 * | 8/2015 | Nagashima | G01B 15/025 | |
| | | | 382/141 | |
| 2015/0241365 A1 * | 8/2015 | Molenaar | G01N 23/083 | |
| | | | 228/104 | |
| 2016/0223477 A1 * | 8/2016 | Lee | G01N 23/083 | |
| 2016/0266055 A1 | 9/2016 | Phin | G01N 23/18 | |
| 2016/0370303 A1 * | 12/2016 | Schmitz | G01N 23/083 | |
| 2017/0082556 A1 * | 3/2017 | Bueno | G01T 1/2012 | |
| 2017/0210059 A1 * | 7/2017 | Pionetti | F16L 13/0263 | |
| 2017/0267264 A1 | 9/2017 | English | | |
| 2017/0294247 A1 | 10/2017 | Maclaughlin | | |
| 2017/0315068 A1 | 11/2017 | Sakaguchi | | |
| 2018/0052120 A1 | 2/2018 | Murakami | | |
| 2018/0277272 A1 | 9/2018 | Park | | |
| 2019/0186658 A1 * | 6/2019 | Rettew | F16L 13/116 | |
| 2019/0201957 A1 * | 7/2019 | Hasegawa | G01N 29/041 | |
| 2019/0308277 A1 * | 10/2019 | Reiz | B29C 65/8253 | |
| 2020/0141884 A1 * | 5/2020 | Goto | G01N 23/046 | |
| 2021/0033237 A1 * | 2/2021 | Tsuto | B23K 37/053 | |

* cited by examiner

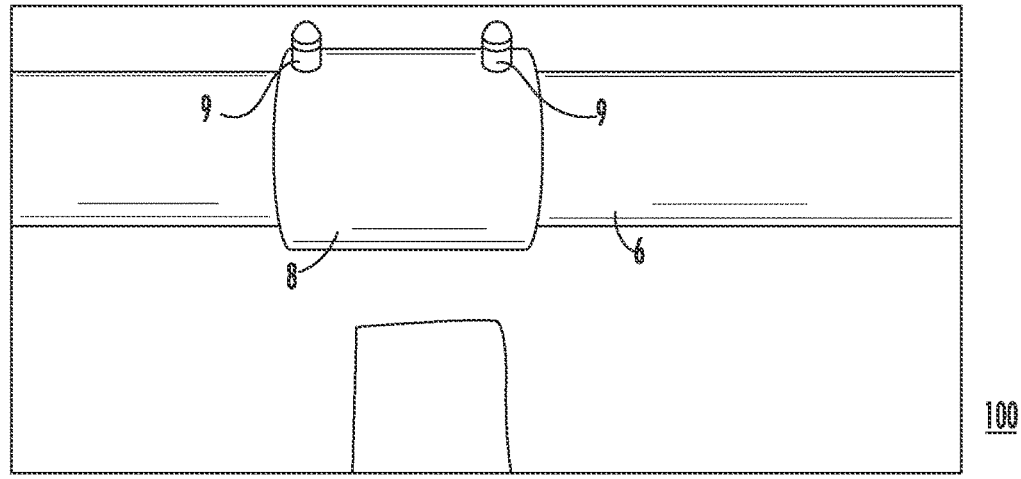
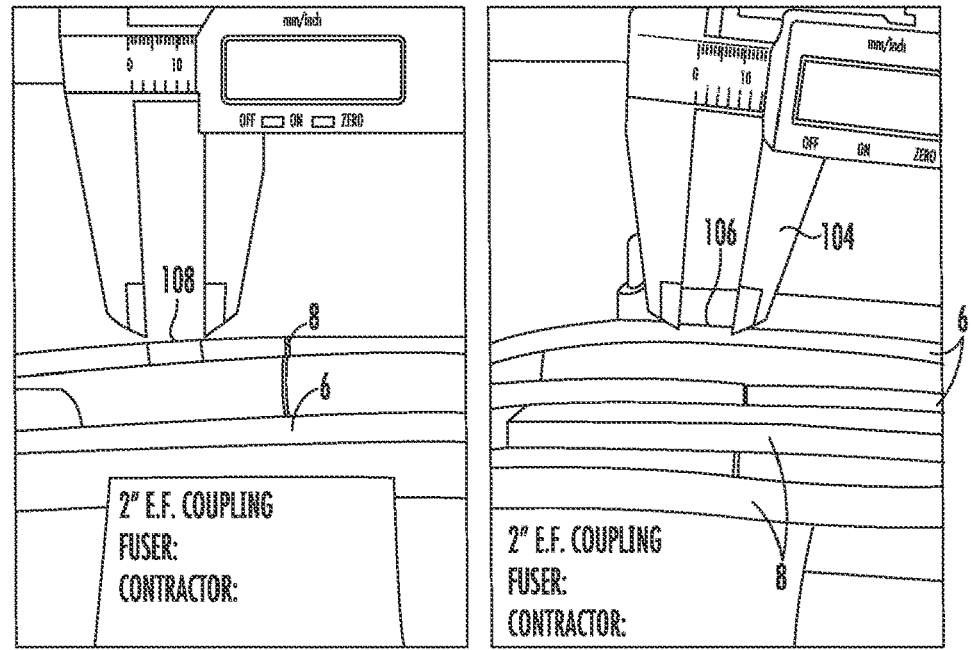
FIG. 2 PRIOR ART

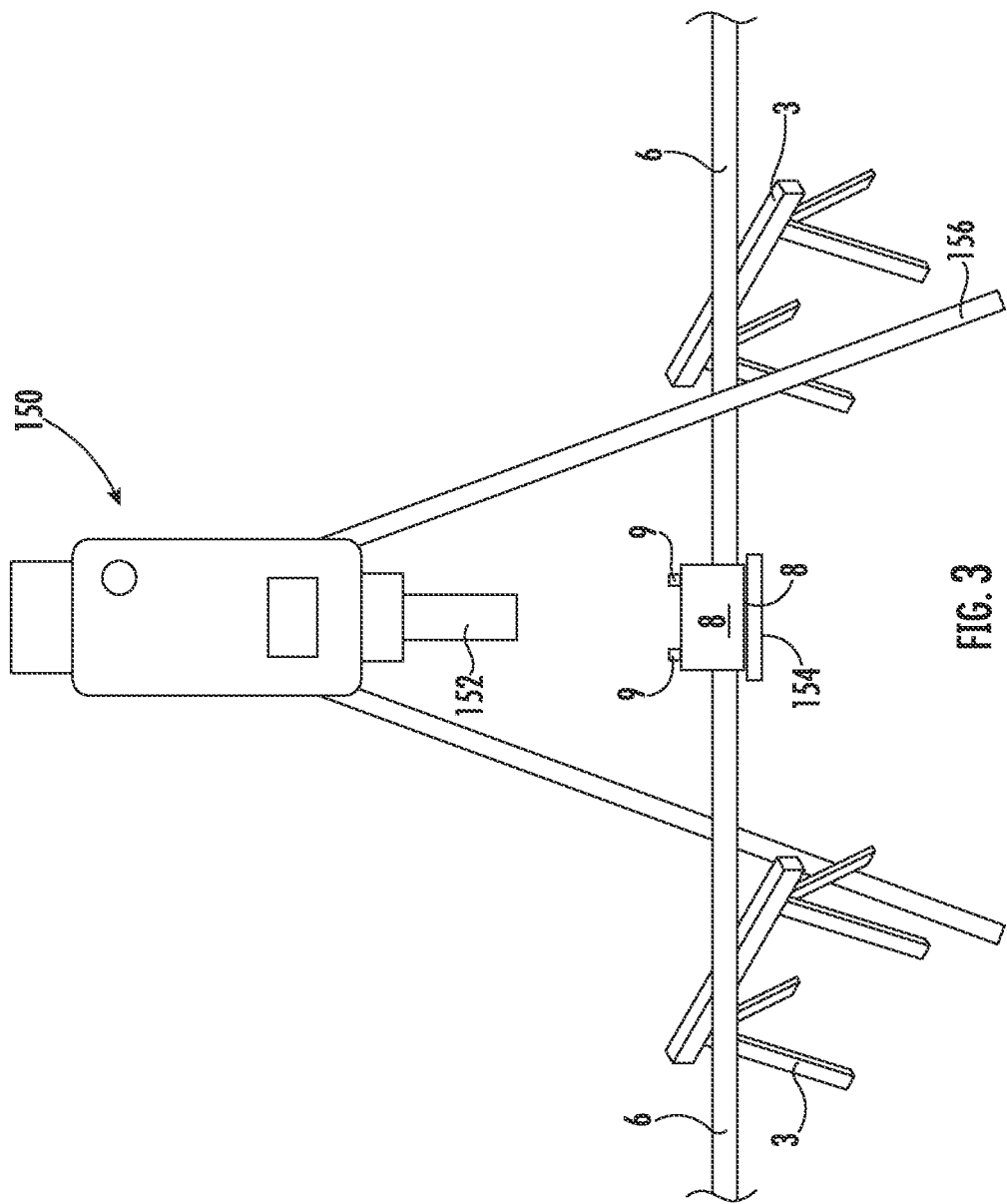

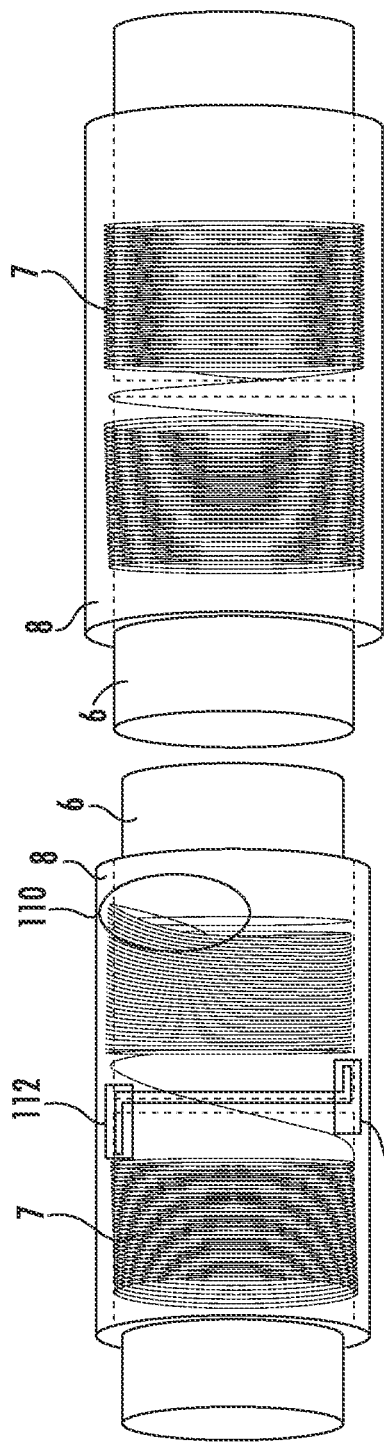
FIG. 5
FIG. 4
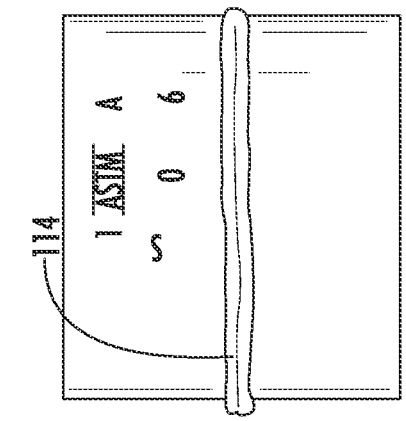
FIG. 8
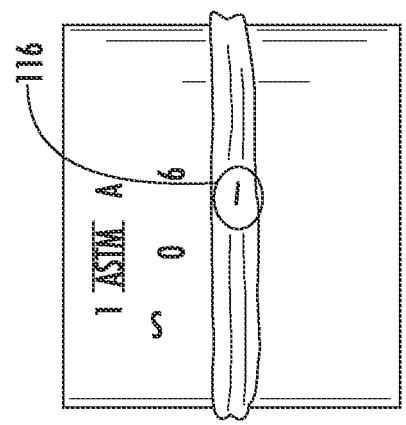
FIG. 7
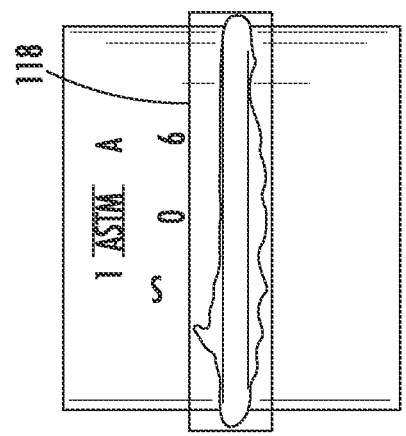
FIG. 6

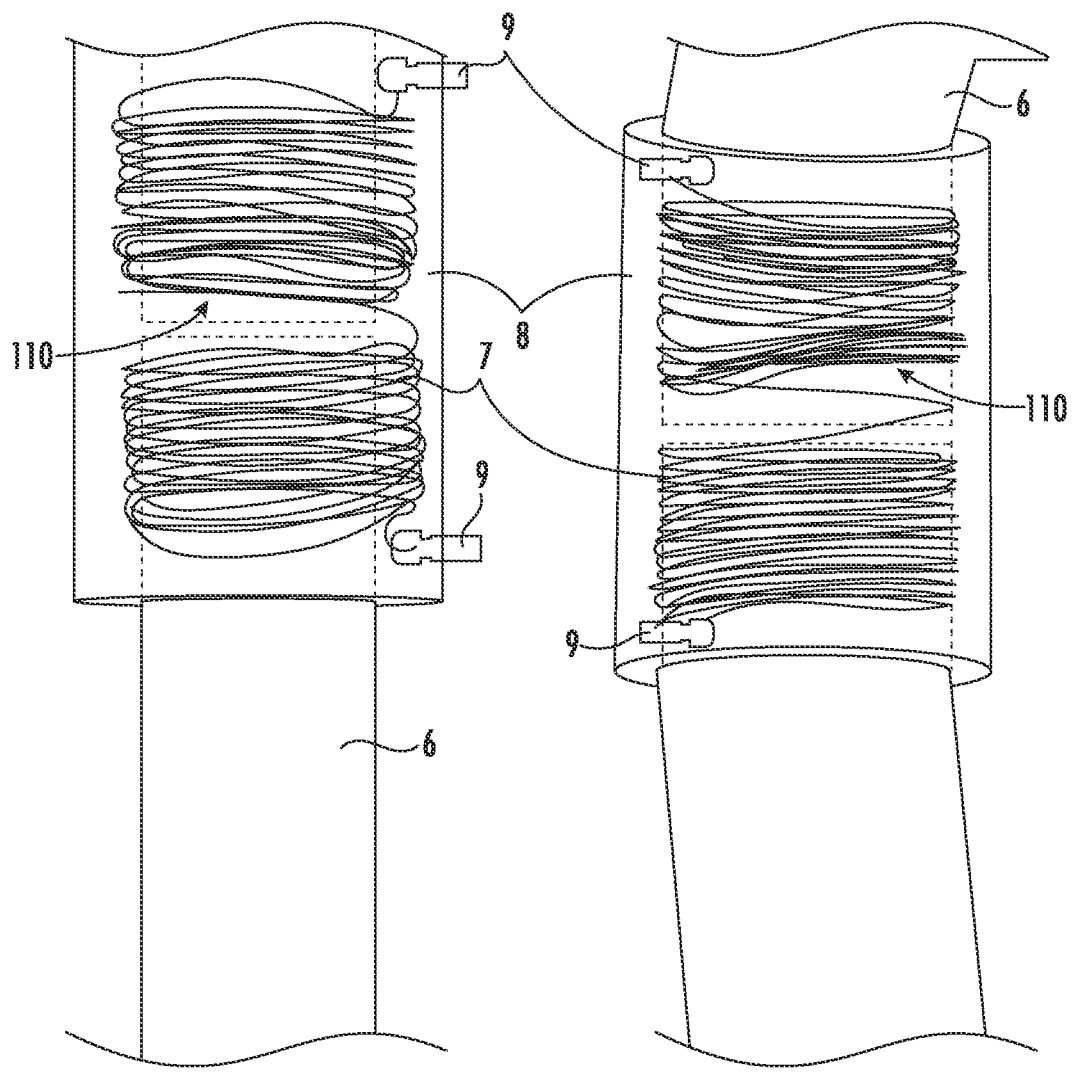

SYSTEM AND METHOD FOR INSPECTING FUSED PLASTIC PIPES

CROSS-REFERENCE TO RELATED APPLICATION

This application is a continuation in part of U.S. patent application Ser. No. 16/504,825, filed Jul. 8, 2019, the disclosure of which is hereby incorporated by reference.

FIELD

This invention relates to the field of plastic pipes and more particularly to a system and method for nondestructive inspecting fused pipes.

BACKGROUND

In recent years, more and more plastic pipe has been deployed in fluid distribution systems, for example, natural gas, liquid natural gas, water, etc. Plastic pipe (e.g., polyethylene pipe) has many advantages over prior iron pipe, including greater resistance to corrosion, quicker and simpler splicing (iron pipe is typically welded), and lower weight improving transportation, safety, and installation equipment requirements, etc.

Some such plastic pipe comes in coils, allowing for extremely long runs without splices, sometimes 250-500-foot runs, while larger diameter plastic pipe typically comes in shorter lengths requiring more splices per mile.

One way to fuse two plastic pipes is to heat the end of each plastic pipe to the melting point of the plastic, then push the molten ends of the pipes together and held until the plastic solidifies. This method, called butt fusion, produces a workable bond between the two lengths of plastic pipe, but requires great precision and technique in holding both ends of the pipe in play until proper cooling has completed. Often, using this method, some of the molten plastic encroaches on the inner diameter of the pipe. Also, once bonded, one cannot see how much plastic from each pipe flowed together and, therefore, one cannot easily tell if the bond is good.

Another method of fusing plastic pipe (or attaching a tap or installing a 'T') is called socket fusion. In socket fusion, a fitting is used in which one plastic pipe is inserted into a first end of the fitting, another plastic pipe is inserted onto another end of the fitting, then an electric voltage is applied to resistive wires that are wound inside the fitting, thereby melting the inner diameter of the fitting and the outer diameter of the pipe so that the plastic from the fitting an the plastic from the pipe bond together. After the electric voltage is discontinued, the plastic solidifies making a proper Joint. In such, it is important that the pipes and fitting not be moved until cooling has completed.

In all versions of fusing of plastic pipe, after the fusing is complete, it is difficult to determine if the fusing was done correctly, as there is typically no or little external evidence of a faulty fusing operation. For example, with socket fusing, unless the pipes are noticeably skewed off axis, there is no way to tell if the pipes were moved during cooling, whether the pipes were not close enough to each other during fusing, etc.

In the past, the only way to tell if two pipes are properly fused was to cut out the section of pipe that was fused and cut cross-sections of the fuse area for inspection with magnifying glasses, etc. Of course, the two pipes then need to be fused together again, probably by the same fuser as the fuser that performed the original fusing. This method of inspection provides a statistical basis for the quality of the fusings, and likely, the quality of similar fusings performed on the same day.

To date, there were no methods and apparatus for determining the quality of a fusing without such destruction.

What is needed is a system that will detect weak or faulty fusings (bad fusings) without destroying those fusings that are good.

SUMMARY

A method and apparatus for testing a fusing without destroying the fusing is disclosed. As such fusing is performed in the field, it is preferred that the testing be performed in the field as well. The testing includes a source of X-ray radiation and a scanning plate that has pixels that change state when exposed to the radiation. The source of the X-ray radiation is positioned on one side of the fusing and the scanning plate or scanning device is positioned on another side of the fusing so that the x-ray radiation passes through the fitting. The radiation radiates the fusing making visible internal voids, weak fusings, and evidence of movement after the plastic of the fitting/pipes melted and flowed together. With such, the quality of the fitting is evident without cutting or otherwise destroying the fitting and, therefore, only weak or otherwise compromised fittings need be cut and redone.

In one embodiment, an apparatus for non-destructive testing of a fuse between plastic pipes inserted into a fusion socket is disclosed including a source of radiation selectively operated to emit an x-ray radiation, a computer, a scanning plate for receiving the x-ray radiation, a scanner that is operatively coupled to the computer and a display operatively coupled to the computer. The source of radiation is positioned on one side of the fuse between the plurality of plastic pipes and the scanning plate receives the x-ray radiation that passes through the fuse while the source of radiation is selectively operated to emit the x-ray radiation. After the source of radiation is discontinued, the scanning plate is moved to the scanner and the scanner scans the scanning plate into an x-ray image that is transferred into a storage of the computer. The computer analyzes the x-ray image of the fuse and recognizes a position of each of the plurality of plastic pipes to determine if the fuse is a bad fuse by the position of each of the plurality of plastic pipes.

In another embodiment, a method of determining if a fuse between plastic pipes within a fusion socket is a bad fuse. The method includes placing a source of x-ray radiation that emits x-ray radiation on one side of the fuse and holding a scanning plate (or scanning device) to an opposing side of the fuse. After the emission of the x-ray radiation the scanning plate is removed from the opposing side of the fuse and moved to a scanner. The scanning plate is scanned to create an x-ray image of the fuse which is transferred into a storage of a computer and displayed on a display of the computer. The x-ray image of the fuse is visually analyzed to determine if the fuse is the bad fuse by recognizing a position of each of the plurality of plastic pipes to determine if the fuse is the bad fuse by the position of each of the plurality of plastic pipes within the fusion socket.

In another embodiment, a method of determining if a fuse between plastic pipes within a fusion socket is a bad fuse includes placing a source of x-ray radiation on one side of the fuse and receiving the x-ray radiation an opposing side of the fuse to create an x-ray image of the fuse from the radiation received at the opposing side of the fuse. The x-ray image is stored in a storage of a computer and then displayed on a display of the computer. It is determined if the fuse is the bad fuse by reading and analyzing the x-ray image and determining if the fuse is the bad fuse by finding, in the x-ray image, any of the following issues: a gap between two of the plastic pipes being greater than a predetermined distance, an end of one of the plastic pipes being further than a predetermined distance from a length-wise center of the fusion socket, or an end of one of the plastic pipes being inserted to far within the fusion socket, thereby blocking flow to a second one of the plastic pipes.

BRIEF DESCRIPTION OF THE DRAWINGS

The invention can be best understood by those having ordinary skill in the art by reference to the following detailed description when considered in conjunction with the accompanying drawings in which:

FIG. 2 illustrates a failure report of the prior art after destructive testing of fused plastic pipes.

FIG. 3 illustrates a view of an x-ray imaging system of the system for non-destructive testing.

FIGS. 4 and 5 illustrate x-ray images taken by imaging system of the system for non-destructive testing.

FIGS. 6, 7, and 8 illustrate x-ray images taken by imaging system of the system for non-destructive testing.

FIGS. 11, 12, and 13 illustrate x-ray images taken by imaging system of the system for non-destructive testing.

DETAILED DESCRIPTION

Figure 1:
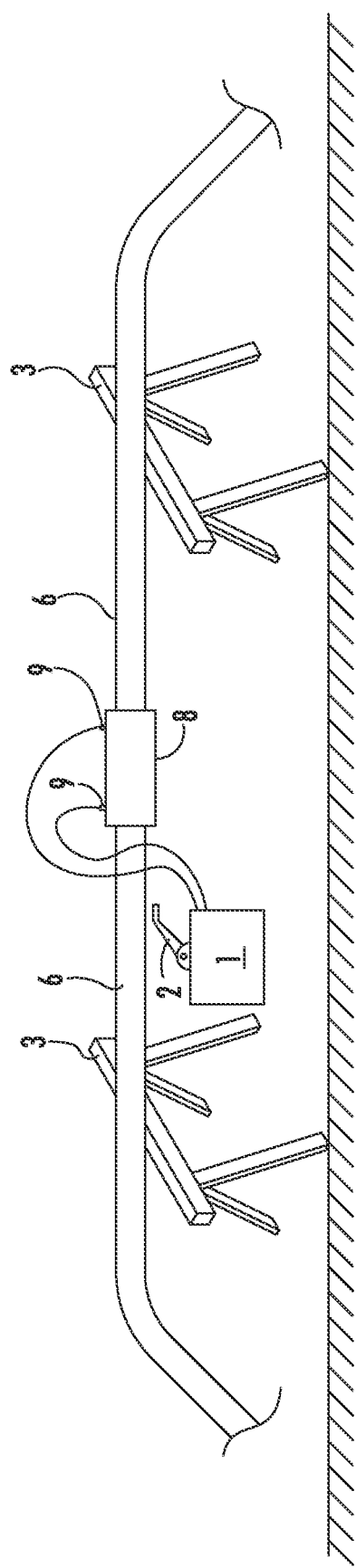
FIG. 1 illustrates a schematic view of a method of fusing of the prior and current art.

Reference will now be made in detail to the presently preferred embodiments of the invention, examples of which are illustrated in the accompanying drawings. Throughout the following detailed description, the same reference numerals refer to the same elements in all figures.

In the current art, more and more plastic pipe is being deployed for distribution of many different fluids (gases or liquids) such as water and fuel gases (e.g., natural gas or liquid natural gas). As such plastic pipe is delivered in sections or in rolls, the current art utilizes several methods of joining two sections (or three sections in a tee) of the plastic pipe, such as butt fusion or socket fusion. These methods of fusion share one common issue—once the ends of two pipes are fused, it is almost impossible (using current art methods) to determine if the fuse is good and will withstand flexing and expected pressures.

Referring to FIG. 1, a schematic view of a method of fusing of the prior and current art is shown. Note that this is but one example of how two sections of plastic pipe 6 are fused and not meant to be all-inclusive.

In this example, the ends of two sections of plastic pipe 6 are prepared (e.g., cleaned and in some cases, rotary shaved), then each section of plastic pipe is lifted off the ground (e.g., by sawhorses 3) and inserted into a fusion socket 8. Next, an electric potential (e.g., from a battery 1 through a switch 2) is applied to electrical terminals 9 of the fusion socket 8. Not visible is a coil of resistive wire 7 (e.g., see FIG. 4) that is wound internally to the fusion socket 8 running from one of the electrical terminals 9 to the other of the electrical terminals 9. When the electric potential is applied to the electrical terminals 9, the resistive wire 7 heats, melting some of the plastic of an outside surface of the plastic pipe 6 and an inside surface of the fusion socket 8. After the electric potential abates (e.g., the switch 2 is turned off), the now co-mingled plastic cools, forming a strong bond between each end of the plastic pipe 6 and the fusion socket 8.

There are many things that can go wrong when fusing two of the plastic pipes 6, caused by, for example, moving either of the plastic pipes 6 before proper cooling, over shaving or uneven shaving of each end of the plastic pipes 6, not cutting each of the plastic pipes 6 at almost exactly 90 degrees, etc. FIGS. 3-21 show examples of plastic pipes 6 that are fused as displayed by the system for non-destructive testing.

Referring to FIG. 2, a failure report after destructive testing of fused plastic pipes of the prior art is shown. In the prior art, inspectors periodically, and randomly, select samples of fuses between plastic pipe 6 to make sure a particular fuser (a person who fuses the plastic pipe 6—similar to a welder of iron or steel pipe) is making good fuses. In the example failure report 100 of FIG. 2, the fuser's name 102 and type/location of the plastic pipe 6 and fuse are recorded. A picture of the plastic pipes 6 and fusion socket 8 with electrical terminals 9 is shown before the samples are cut. Each sample is cut out of the plastic pipes 6, then cut into strips and examined to determine if that sample had been fused properly. In this example, heavy scrapes 106 were found, measuring 0.031" with a caliper 104 when the maximum allowable tolerance is 0.007". This type of fusion often results in less melting of the plastic pipe 6, thereby leading to a weak bond between the plastic pipe 6 and the fusion socket 8 that, after burying under dirt, highways, etc., often begins to leak.

The information provided by such destructive testing is somewhat of a measurement of the care and quality of the fuser, so if this fuse is suspect, it is likely that other fuses by the same fuser are also suspect and need to be inspected and likely redone.

Unfortunately, since the plastic pipe 6 was cut to take the above sample, it now has to be fused again, often by the same fuser.

Referring to FIG. 3, a view of an x-ray imaging system of the system for non-destructive testing is shown. In this example, the plastic pipes 6 are shown held by saw horses 3 and the fuse (in this example, with a fusion socket 8 having electrical terminals 9 are shown.

A source of radiation 150 is held in position, for example, by legs 156 of a tripod. The source of radiation 150 is remotely controlled to emit radiation (e.g., x-rays) (optionally through a lens 152) and directed at the fuse. In some embodiments, the lens 152 is made of a material such as Beryllium which allows enough radiation out of the source of radiation so as to penetrate the fuse, but a lower amount of radiation so as to not radiate harmful radiation towards operators of the source of radiation.

Preferably, on the opposing side of the fuse is a scanning device or a scanning plate 154 such as a phosphorous plate. The scanning plate 154 records exposure to radiation across the surface of the scanning plate 154. The scanning plate 154 is held to the plastic pipe 6 at the fuse by any desired mechanism (e.g., using tape, resilient straps, rigs . . . ). As will be shown with FIG. 22, after the source of radiation 150 is activated (initiating emission of x-ray radiation) for a period of time and the scanning plate 154 is exposed to the radiation through the ends of the plastic pipe 6 and the fusion socket 8. The source of radiation 150 is deactivated (stopping) emission of x-ray radiation) and the scanning plate 154 is scanned into an image by placing the scanning plate 154 is placed on a scanner 160 (see FIG. 22), which also erases the scanning plate 154 so that it is ready for the next scan.

Now several examples of images captured by the system for non-destructive testing will be shown and described.

Referring to FIGS. 4 and 5, x-ray images taken by imaging system of the system for non-destructive testing are shown. The resistive wire 7 of the fusion socket 8 is shown wrapped in a spiral within the fusion socket 8. There are two issues highlighted in FIG. 4. The first is a gap 112 between the ends of the plastic pipe 6 and the fusion socket 8. There is a predetermined tolerance (e.g., predetermined distance) allowed for a gap 112 between the ends of the plastic pipe 6 and the fusion socket 8, typically set by local or nation-wide codes for fusion of plastic pipes 6. The second is an uneven or irregular spiral of the resistive wire 7, as the resistive wire 7 (before heating) is evenly wound with each turn of the resistive wire 7 separated from each successive turn of the resistive wire 7. These are examples of a bad fuse that is likely to fail once the plastic pipe 6 is pressurized or at some time before the expected end-of-life of the pipeline. In the highlighted area, there is an uneven spiral 110 as the windings of the resistive wire 7 are uneven and successive turns touch each other. This is evident of movement of the plastic pipe 6 before the plastic has had sufficient time for cooling. In FIG. 5, a good fuse is shown as evident by a lack of gaps (gaps 112 in FIG. 4) and a relatively even spiral of the resistive wire 7.

Referring to FIGS. 6, 7, and 8, x-ray images taken of a butt fuse by imaging system of the system for non-destructive testing are shown. In FIG. 6, the x-ray image shows an uneven fuse 118 (an example of a bad fuse), likely caused by dirt on the ends of the plastic pipes 6 before fusing. In FIG. 7, a void 116 has been detected in the x-ray image (another example of a bad fuse). Such a void will leak once the plastic pipe 6 is put under pressure. In FIG. 8, a good butt fuse is shown in which the ends of the plastic pipe were properly cleaned, properly heated, and held together without movement until the fuse solidified.

Figure 9:
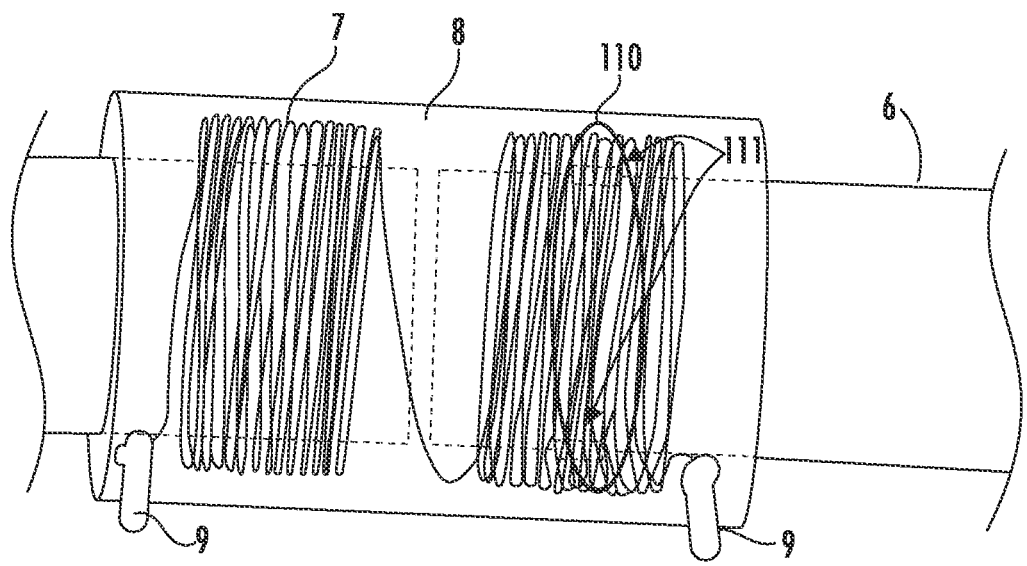
FIGS. 9 and 10 illustrate x-ray images taken by imaging system of the system for non-destructive testing.
Figure 10:
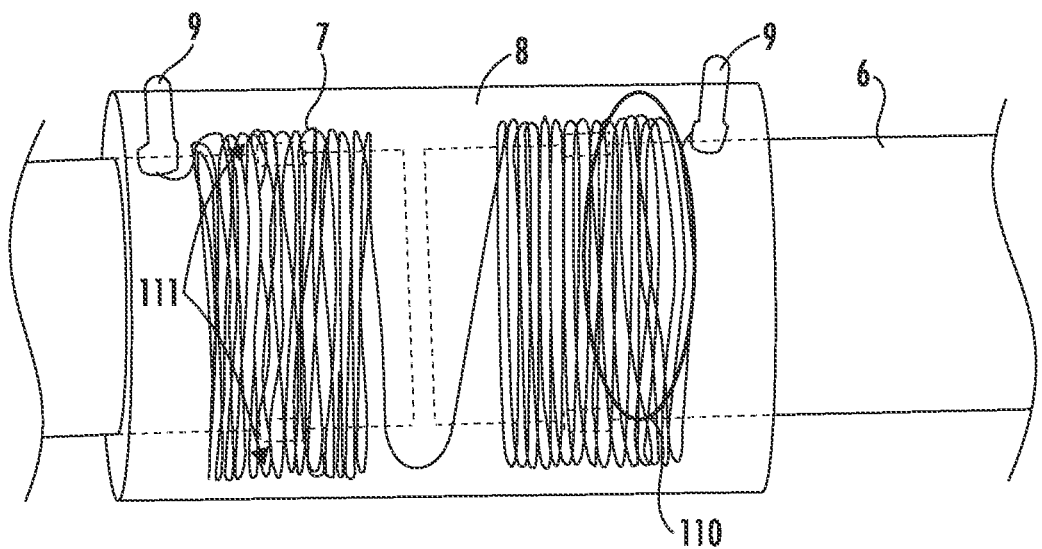

Referring to FIGS. 9 and 10, x-ray images taken by imaging system of the system for non-destructive testing are shown. The resistive wire 7 of the fusion socket 8 is shown wrapped in a spiral within the fusion socket 8. There are two issues highlighted in FIGS. 9 and 10. The first is voids 111 between the ends of the plastic pipe 6 and the fusion socket 8. According to current standards, small voids are allowable, for example, up to 10% of the fusion zone length, or even smaller voids 111 in which the combined void size is less than 20% of the fusion zone length.

The second is an uneven spiral 110 of the resistive wire 7, as the resistive wire 7 (before heating) is evenly wound with each turn of the resistive wire 7 separated from each successive turn of the resistive wire 7. In the highlighted area, there is an uneven spiral 110, the windings of the resistive wire 7 are uneven and successive turns touch each other. This is evident of movement of the plastic pipe 6 before the plastic has had sufficient time for cooling. These are examples of a bad fuse.

Figure 13:
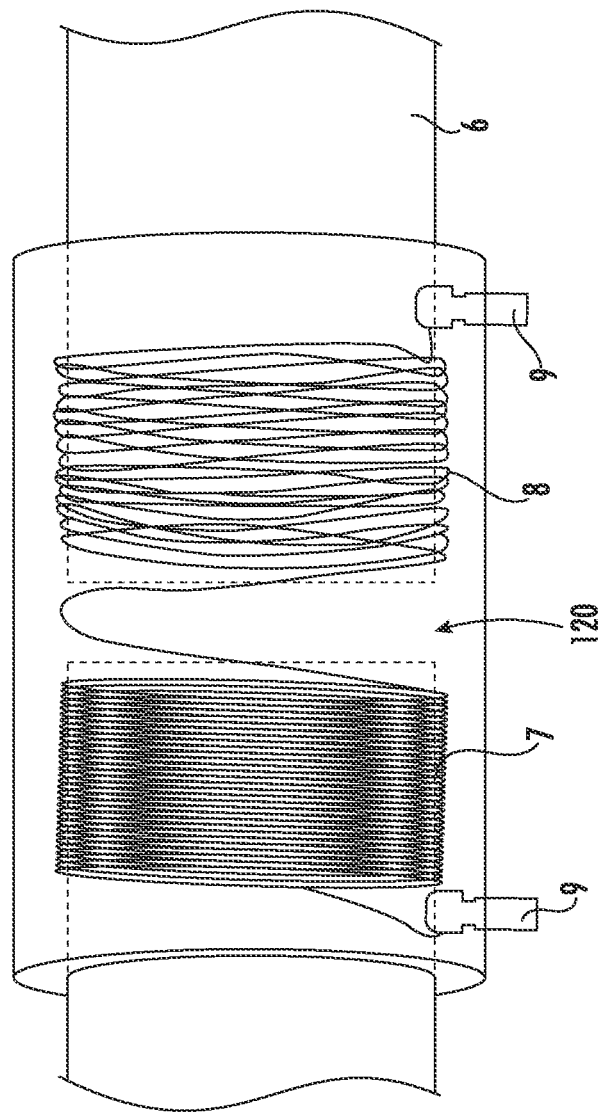

Referring to FIGS. 11, 12, and 13, more examples of x-ray images taken by imaging system of the system for non-destructive testing are shown. The resistive wire 7 of the fusion socket 8 is shown wrapped in a spiral within the fusion socket 8. Again, there is an uneven spiral 110 of the resistive wire 7, with the resistive wire 7 likely shorting to itself during heating creating hot spots and cold spots. This uneven spiral 110, the windings of the resistive wire 7 is evident of movement of the plastic pipe 6 before the plastic has had sufficient time for cooling. In FIG. 13, another issue with the fuse is evident. There is a gap 120 of 0.624 inches between the ends of the two plastic pipes 6. This creates a reliance totally on the strength of the fusion socket 8 in the area of the gap 120, possibly leading to a rupture once the plastic pipes 6 are pressurized. This is an example of a bad fuse. Note that many local or nation-wide codes specify a maximum gap 120 or distance allowed between the ends of the plastic pipes 6.

Figure 14:
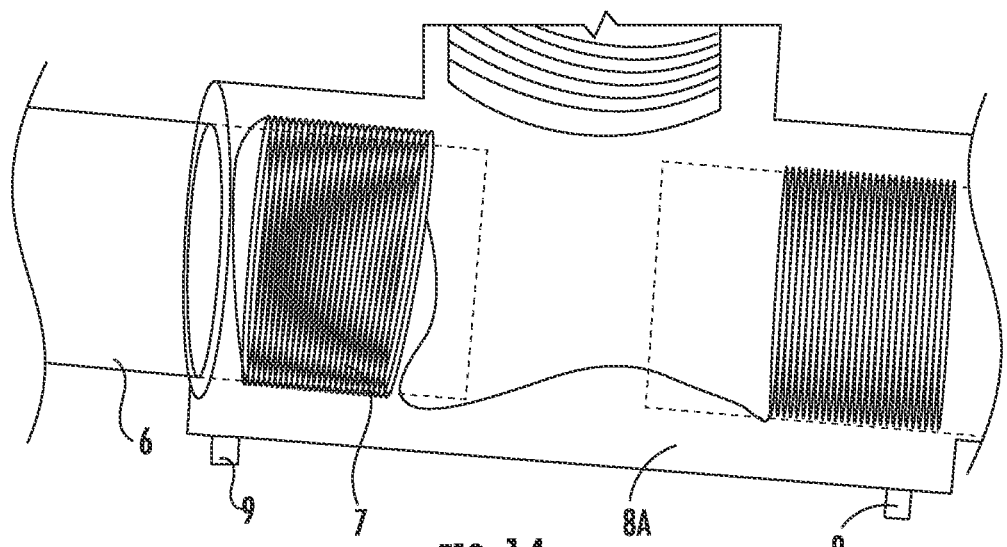
FIGS. 14 and 15 illustrate x-ray images taken by imaging system of the system for non-destructive testing.
Figure 15:
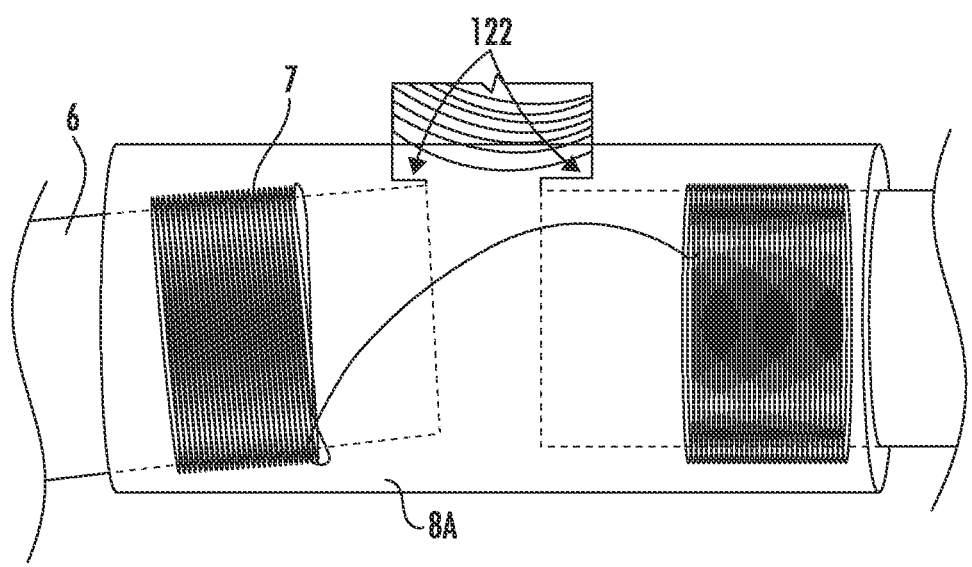

Referring to FIGS. 14 and 15, x-ray images taken of a tee fusion socket joining three plastic pipes 6 by imaging system of the system for non-destructive testing are shown. In the case of a fusion tee 8A, it is important not to insert the ends of the plastic pipe 6 too far into the fusion tee 8A, as if the ends of the plastic pipe 6 are inserted too far into the fusion tee 8A, the ends of the plastic pipe 6 will block flow of the fluid to the third leg of the fusion tee 8A. The resistive wire 7 of the fusion tee 8A is shown wrapped in a spiral within the fusion tee 8A. There is only slight skewing of the resistive wire 7 but there is other evidence that the plastic pipe 6 was moved before the melted plastic of the plastic pipe 6 and the fusion tee 8A sufficiently hardened. In FIG. 15, the ends 122 of the plastic pipes 6 intrude upon the third leg of the fusion tee 8A. This reduces the amount of fluid that will flow to the third leg of the fusion tee 8A. Such intrusion is even more evident in FIG. 17 where a first one of the plastic pipes 6 completely blocks a second one of the plastic pipes 6.

Figure 16:
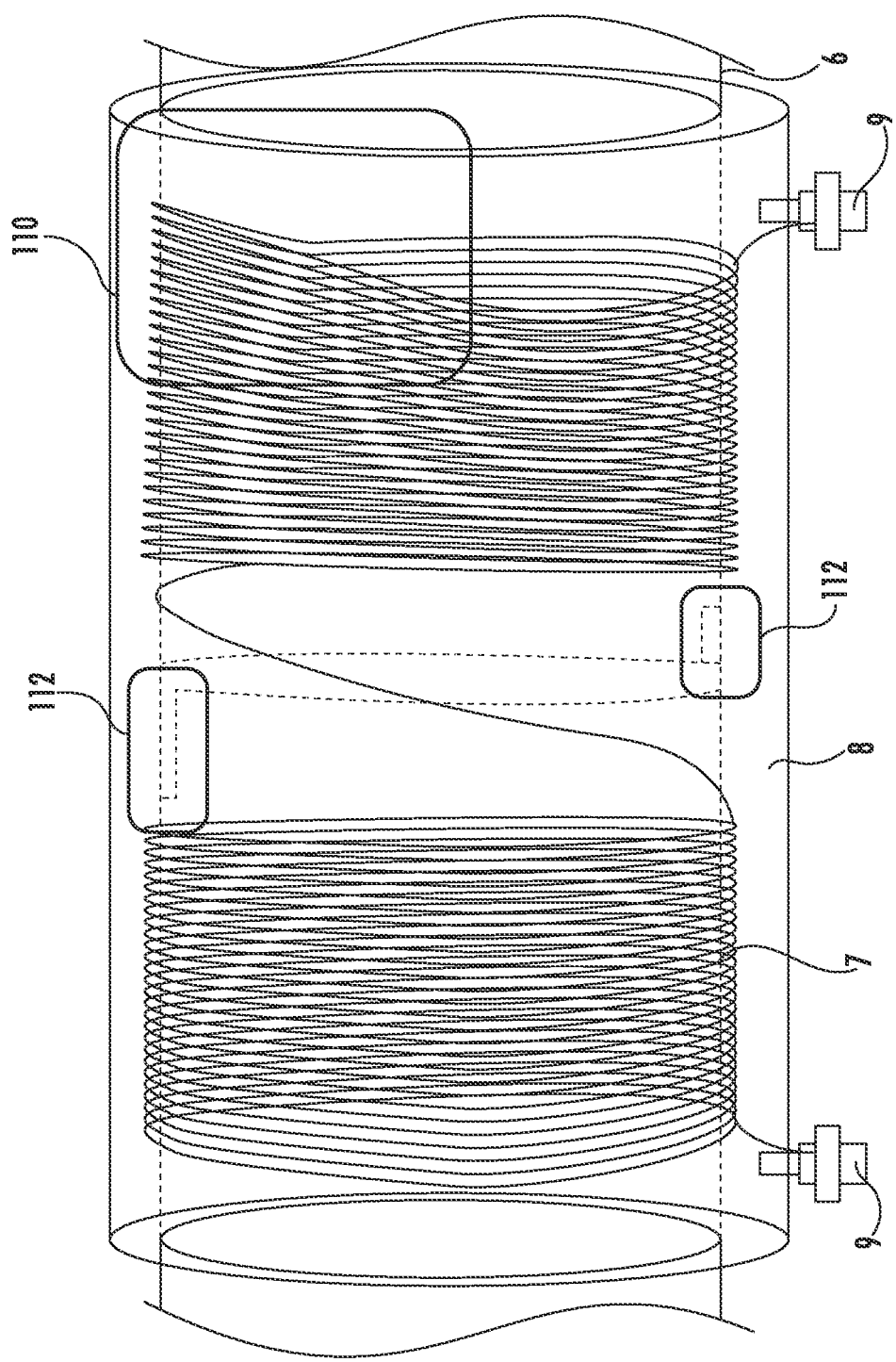
FIG. 16 illustrates an x-ray image taken by imaging system of the system for non-destructive testing.

Referring to FIG. 16, another x-ray image taken by imaging system of the system for non-destructive testing is shown. The resistive wire 7 of the fusion socket 8 is shown wrapped in a spiral within the fusion socket 8. Again, there is an uneven spiral 110 of the resistive wire 7, in this case one can see the top portion of the resistive wire 7 skewed towards the right as it was likely that the plastic pipe 6 to the right of FIG. 16 bent downward before substantial cooling occurred. This is further evident by the gaps 112 between the ends of the two plastic pipes 6 and the fusion socket 8.

Figure 17:
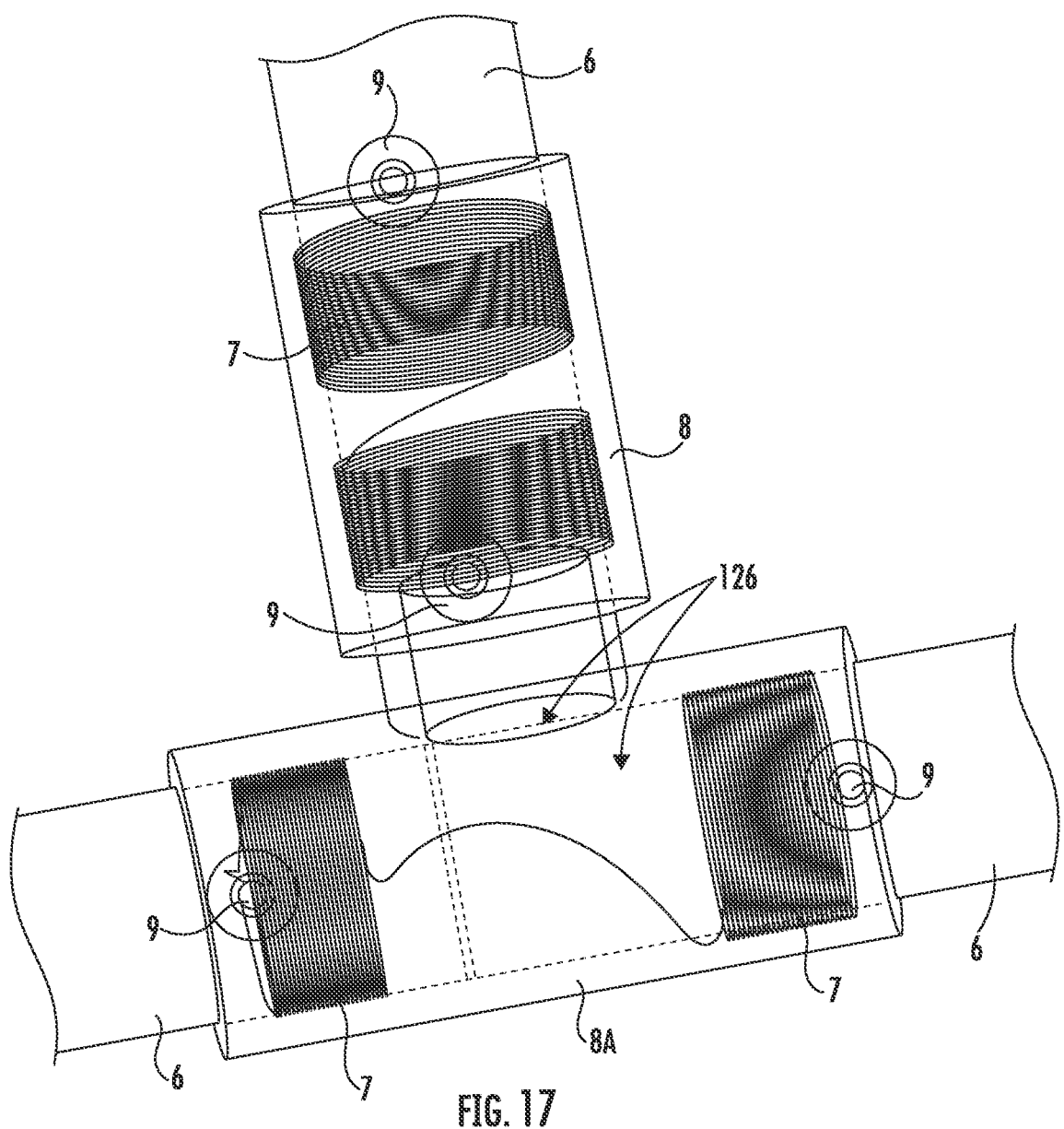
FIG. 17 illustrates an x-ray images of a tee joint taken by imaging system of the system for non-destructive testing.

Referring to FIG. 17, another x-ray images of a fusion tee 8A taken by imaging system of the system for non-destructive testing is shown. To repeat, in the case of a fusion tee 8A, it is important not to insert the ends of the plastic pipe 6 too far into the fusion tee 8A. If the ends of the plastic pipe 6 are inserted too far into the fusion tee 8A, the ends of the plastic pipe 6 will block flow of the fluid to the third leg of the fusion tee 8A. In the example of FIG. 17, the end 126 of one of the plastic pipes 6 intrudes upon the third leg of the fusion tee 8A, totally occluding fluid flow to/from the third leg of the fusion tee 8A.

Figure 18:
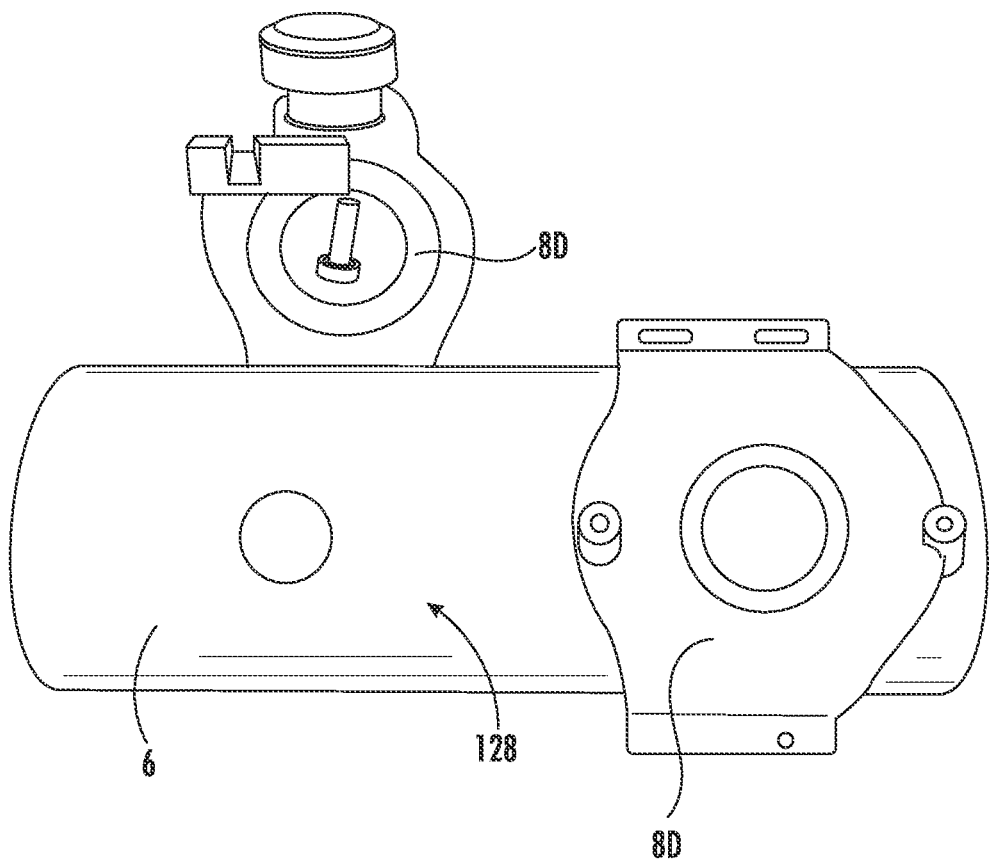
FIGS. 18 through 21 illustrate x-ray images of an electrofusion service tee taken by imaging system of the system for non-destructive testing.
Figure 19:
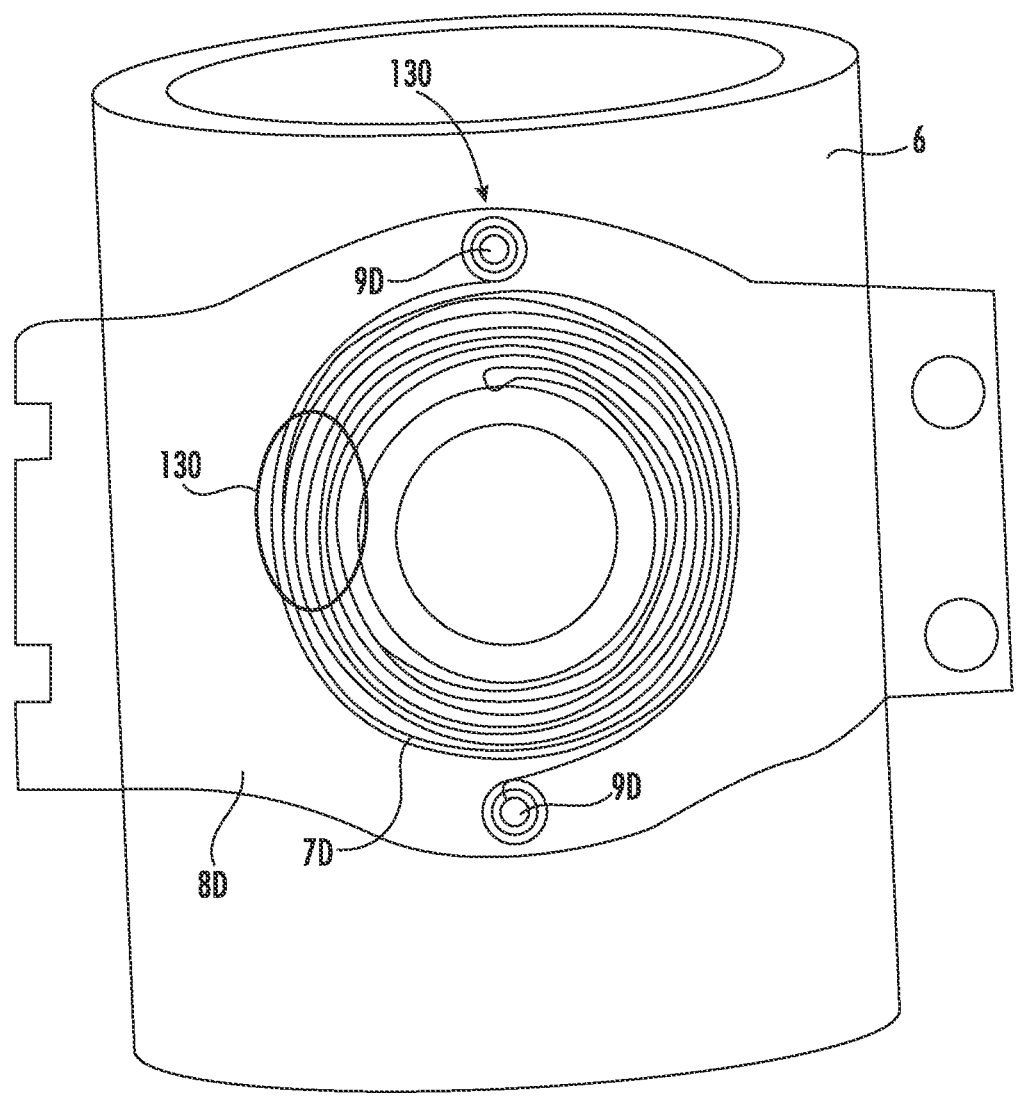
Figure 20:
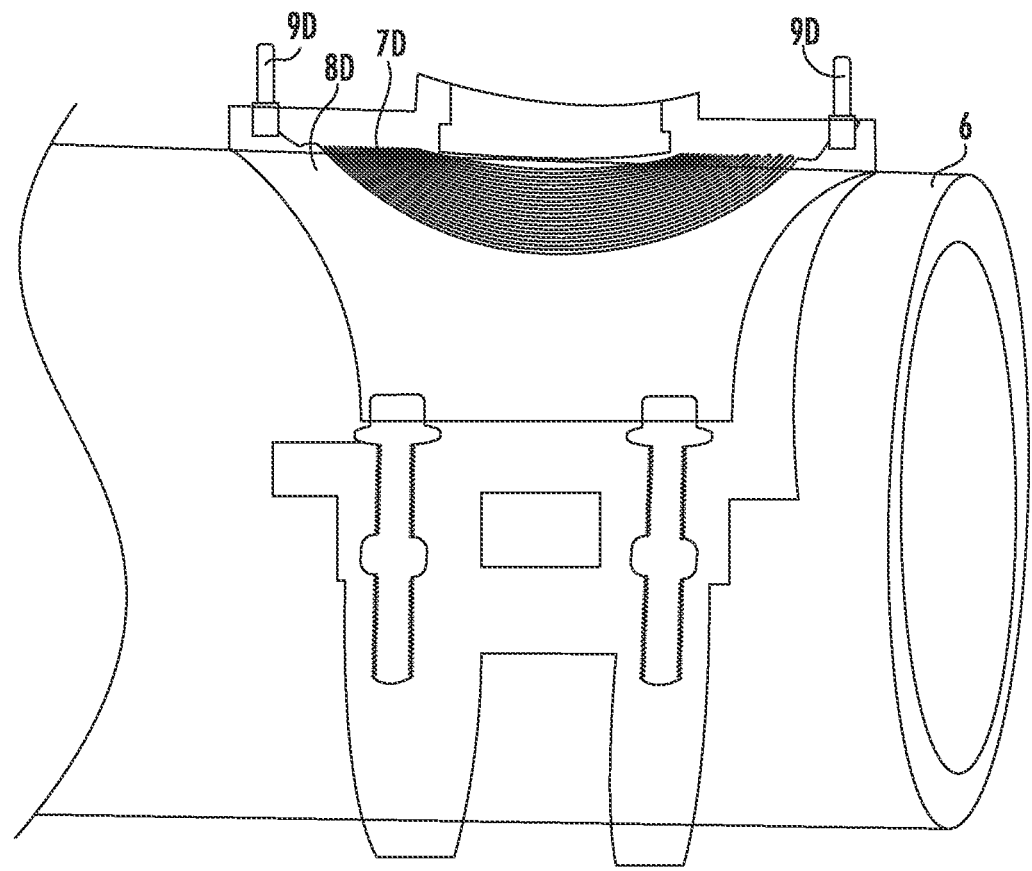
Figure 21:
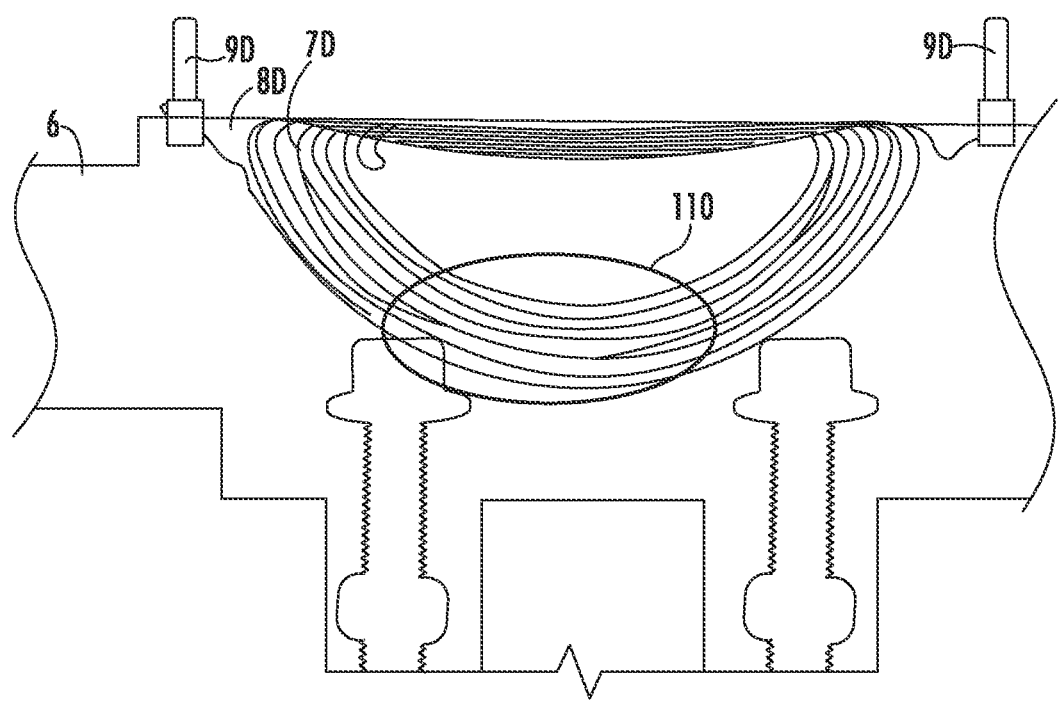

Referring to FIGS. 19 through 21, x-ray images of an electrofusion service tee taken by imaging system of the system for non-destructive testing are shown. In FIG. 18, a failure report of the prior art is shown in which one tap tee 8D remains connected to the plastic pipe 6 but another tap tee 8d (not shown) fell off of the plastic pipe 6 at the location of the tap hole 128. In FIG. 19, reasons for such failure are evident as the same fuser likely made both fuses. There is a blow out 130 near the electrical contact 9D and several of the resistive wires 7D have shorted 131, as the tap tee 8D was likely moved before the plastic of the tap tee 8D and the plastic pipe 6 cooled enough to harden. The same is shown from the side in FIG. 20 and the uneven spiral 110 appears to have a short between turns of the resistive wire 7D is shown from the side in FIG. 21.

Many of the above issues with butt fuses, fusion socket 8, fusion tees 8A, tap tees 8D, etc., are not evident until either a destructive test is performed or a field failure occurs. Being that the plastic pipes 6 are often buried underground, often under roadways, sidewalks, parking lots, etc., a failed fuse is often very difficult to find and expensive to repair.

Figure 22:
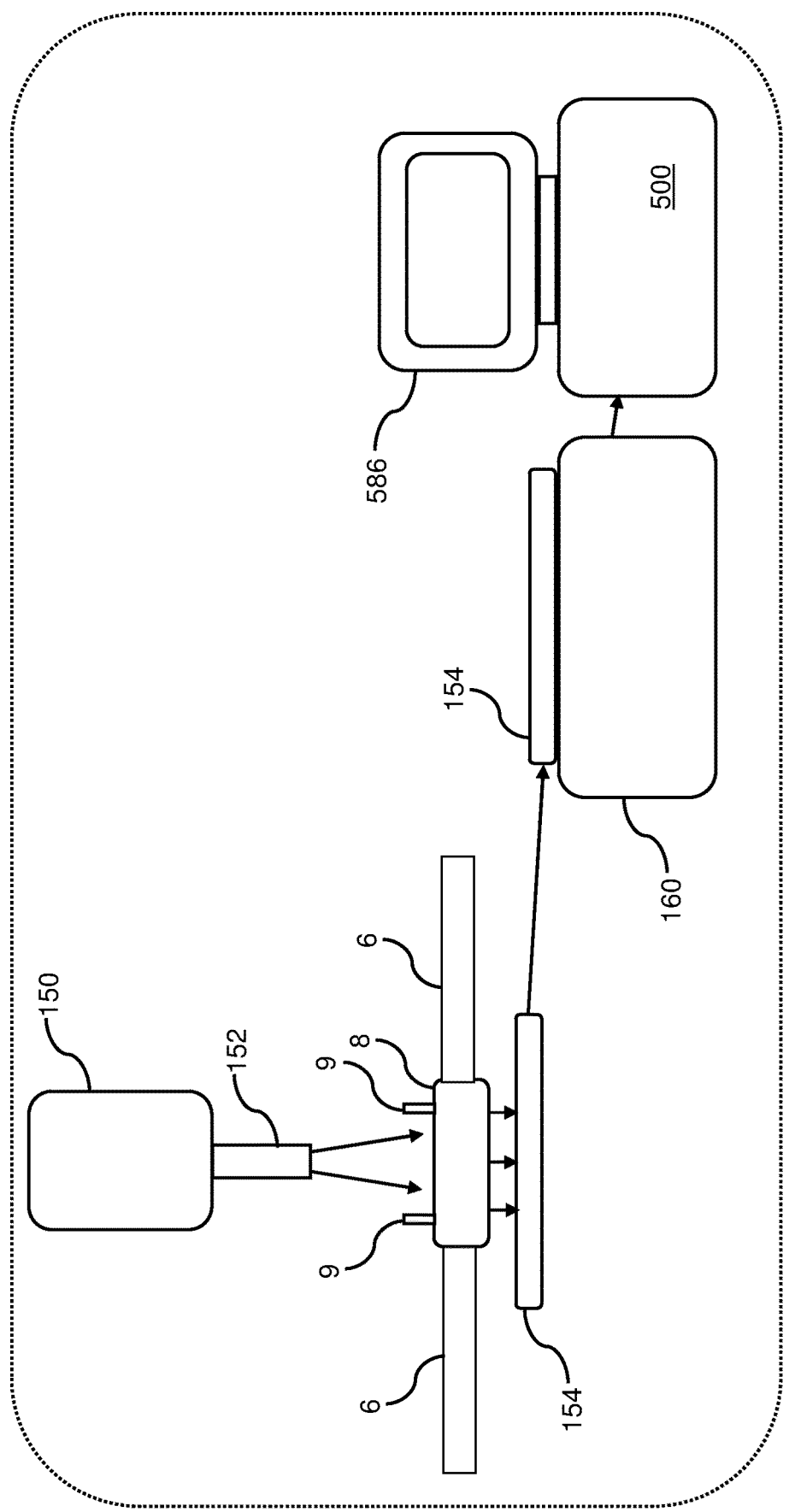
FIG. 22 illustrates a schematic view of the system for non-destructive testing.

Referring to FIG. 22, a schematic view of the system for non-destructive testing is shown. The source of radiation 150 (e.g., x-ray radiation) is shown in position, in this example, above a fusion socket 8 that connects two sections of the plastic pipe 6. The source of radiation 150 is remotely controlled to emit radiation (e.g., x-rays) through a lens 152 and directed at the fuse, in this case, the fusion socket 8, though any thermal fuse of two or more plastic parts (e.g., plastic pipes 6). In some embodiments, the lens 152 is made of a material such as Beryllium which allows enough radiation out of the source of radiation so as to penetrate the fuse, but a lower amount of radiation so as to not radiate harmful radiation towards operators of the source of radiation.

On the other side of the fuse (or in this example, fusion socket 8) is a scanning plate 154 such as a phosphorous plate. The scanning plate 154 records exposure to radiation across the surface of the scanning plate 154. After the source of radiation 150 is activated for a period of time and the scanning plate 154 is exposed to the radiation through the ends of the plastic pipe 6 and the fusion socket 8, the scanning plate 154 is removed and places upon a scanner 160. The scanner scans an image from the scanning plate 154 while also erasing the scanning plate 154 so that it is ready for the next scan. The scanner 160 is, for example, computed radiography scanner and the amount of radiation received at each pixel of the scanning plate is recorded to create an x-ray image of the fuse. An example of a scanner 160 is a computed radiography scanner such as the CR 4100 produced by Virtual Media Integration of Pensacola, Florida, USA. Note that as technology progresses, it is fully anticipated that the image generation will be automatic from the scanning plate 154 without need of a separate scanner 160.

The scanner 160 is operatively coupled to a computer 500 (see FIG. 25) where the x-ray image is stored, enhanced, recognized, and/or displayed on, for example, a display 586. Note that it is fully anticipated that instead of using a plate system, a sensor array (scanner) be positioned at the fuse 6 and the x-ray image is scanned by the sensor array and copied directly into the computer.

In some usage scenarios, the system for non-destructive testing is installed in a vehicle (e.g., a van) so that the images are available for review immediately and any unacceptable fuses be recognized and removed (cut out and re-fused) before burying underground.

As it is important to archive results of testing and to provide feedback to the company performing the fusing and the employees performing the fusing (fusers), the images are often saved in storage such as persistent memory 574 (see FIG. 25) of the computer 500 and the images (and reports) are anticipated to be transferred to remote storage either using removable storage removably interfaced to the computer 500 or by transferring the images (and reports) over a network 502 (see FIG. 25) for remote storage, viewing, analysis, feedback, etc.

In some embodiments, software running on the computer 500 recognizes some or all flaws using image enhancement and recognition. For example, as the resistive wires 7 are typically factory wound in an evenly spaced spiral. Image recognition detects the contrast of the resistive wires 7 against the plastic of the fusion socket 8 and the plastic of the plastic pipe 6 and the software measures the continuous distance between each turn/loop of the resistive wire 7, detecting if two adjacent turns of the resistive wire 7 are too close or too far from each other. In a similar way, the software locates each end of the plastic pipe 6 within the fusion socket 8 and determines if each end is close enough to each other. As for a fusion tee 8A, the software locates each end of the plastic pipe 6 within the fusion tee 8A and determines if the ends of the plastic pipe 6 encroach upon the third leg of the fusion tee 8A.

Figure 23:
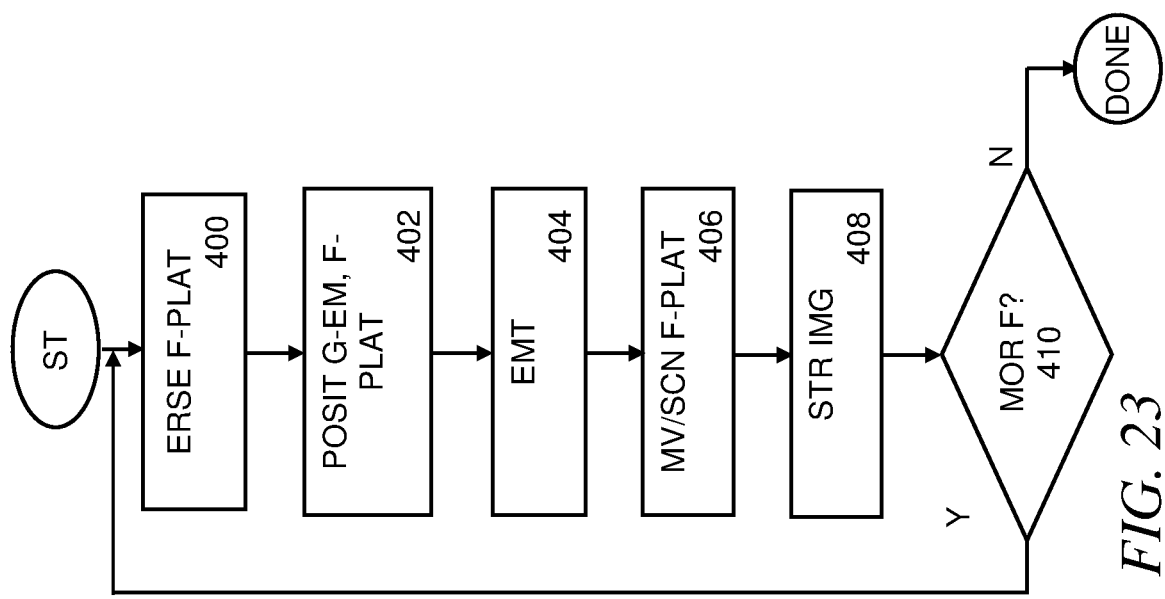
FIGS. 23-24 illustrate exemplary flow diagrams of the system for non-destructive testing.
Figure 24:
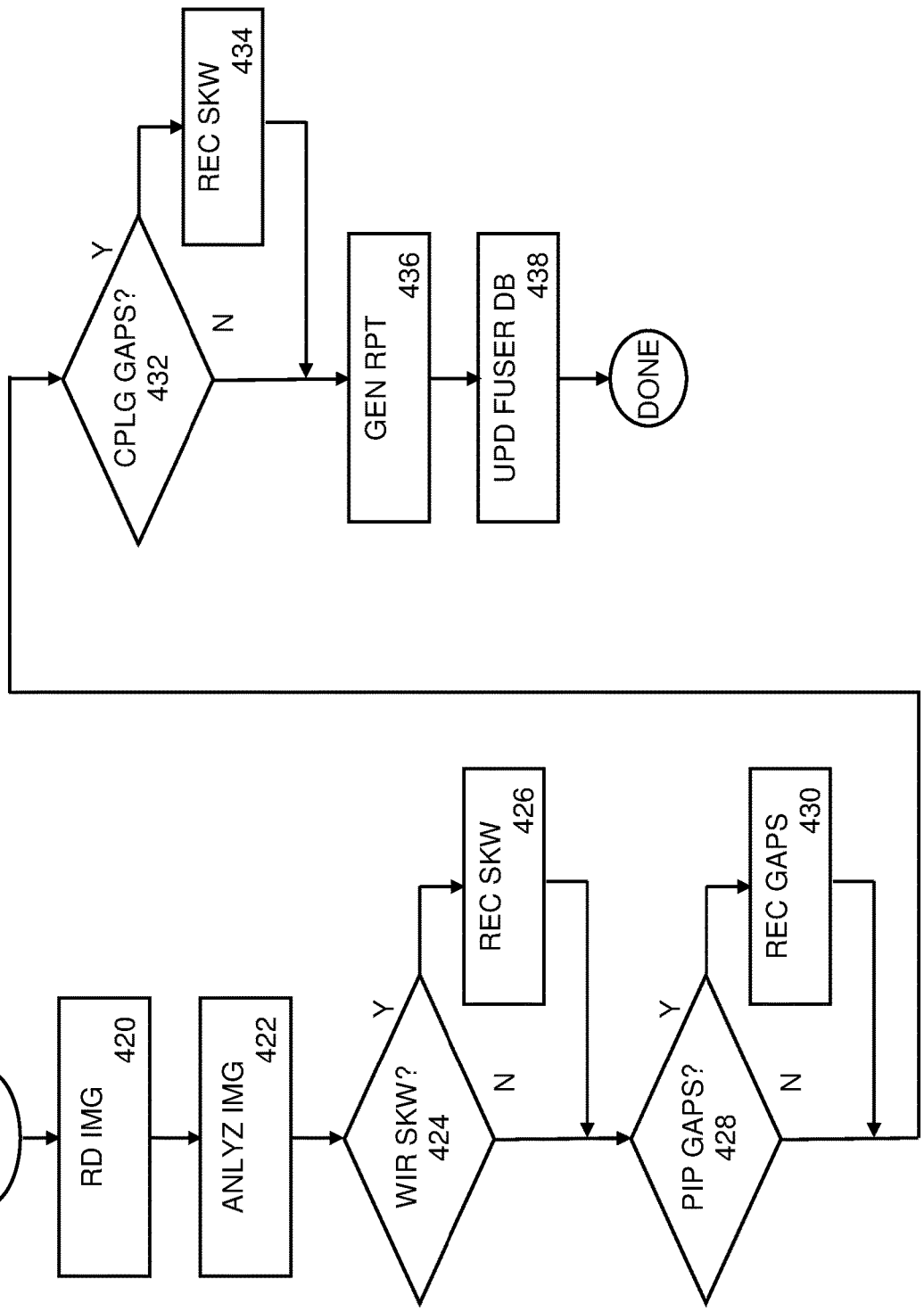

Referring to FIGS. 23-24, exemplary flow diagrams of the system for non-destructive testing are shown. The flow begins with erasing 400 the scanning plate 154 (if the scanning plate 154 was not previously erased). Now the source of radiation 150 and the scanning plate 154 are positioned 402 on opposite sides of the fuse. Note that often images of the same fuse are captured at different angles to detect problems that are not evident from only one angle.

Now the source of radiation 150 is enabled to emit 404 radiation (e.g., x-rays). Once the source of radiation 150 is stopped, the scanning plate 154 is moved 406 to the scanner 160 and scanned to extract the x-ray image of the fuse. The x-ray image of the fuse is then stored 408 (e.g., in persistent memory 574 of the computer). If there are more fuses to test 410, the above is repeated, otherwise the non-destructive testing is complete.

In FIG. 24, an exemplary program flow of an automated fuse quality check is shown for one x-ray image, though the same is applied to all x-ray images as desired. In this, the software reads 420 the x-ray image (e.g., from persistent memory 574) and analyzes 422 the x-ray image by, for example, enhancing the x-ray image, detecting the resistive wires 7, detecting outer edges and ends of the plastic pipes 6, detecting inner edges of the socket 8/8A/8D, etc.

In this example, the software determines if there is skewing 426 of the resistive wires 7, and if there is skewing 426 of the resistive wires 7, the software records the skewing 426 in the report for that fuse. Note that such skewing is determined by a pre-set tolerance of skewing of the resistive wires 7 based upon local or industry standards.

Now, the software determines if there is/are gaps 428 between the ends of the plastic pipes 6, and if there is/are gaps 428 between the ends of the plastic pipes 6, the software records the gaps 430 in the report for that fuse. Note that an acceptable gap is determined by a pre-set gap tolerance based upon local or industry standards.

Now, the software determines if there is/are coupling gaps 432 between the ends of the plastic pipes 6 and the fusion socket 8/8A, and if there is/are coupling gaps 432, the software records the coupling gaps 434 in the report for that fuse. Note that an acceptable coupling gap is determined by a pre-set gap tolerance based upon local or industry standards.

Next, a report is generated 436 including the location of the fuse, an identification of the fuser, etc.

Also, in some embodiments, a global fuser database is updated 438 with qualitative measurements of the fuse as well as issues found with the fuse. In this way, each fuser will have a history showing a percentage of faulty fuses, overall quality numbers, quality trajectories (e.g., quality improving or falling), etc., for use in determining how many of that fuser's fuses need inspection, performance reviews, etc. For example, if 50% of fuses made by a particular fuser are faulty, then all fuses by that fuser need to be inspected and that fuser needs feedback and/or disciplinary action, etc.

Figure 25:
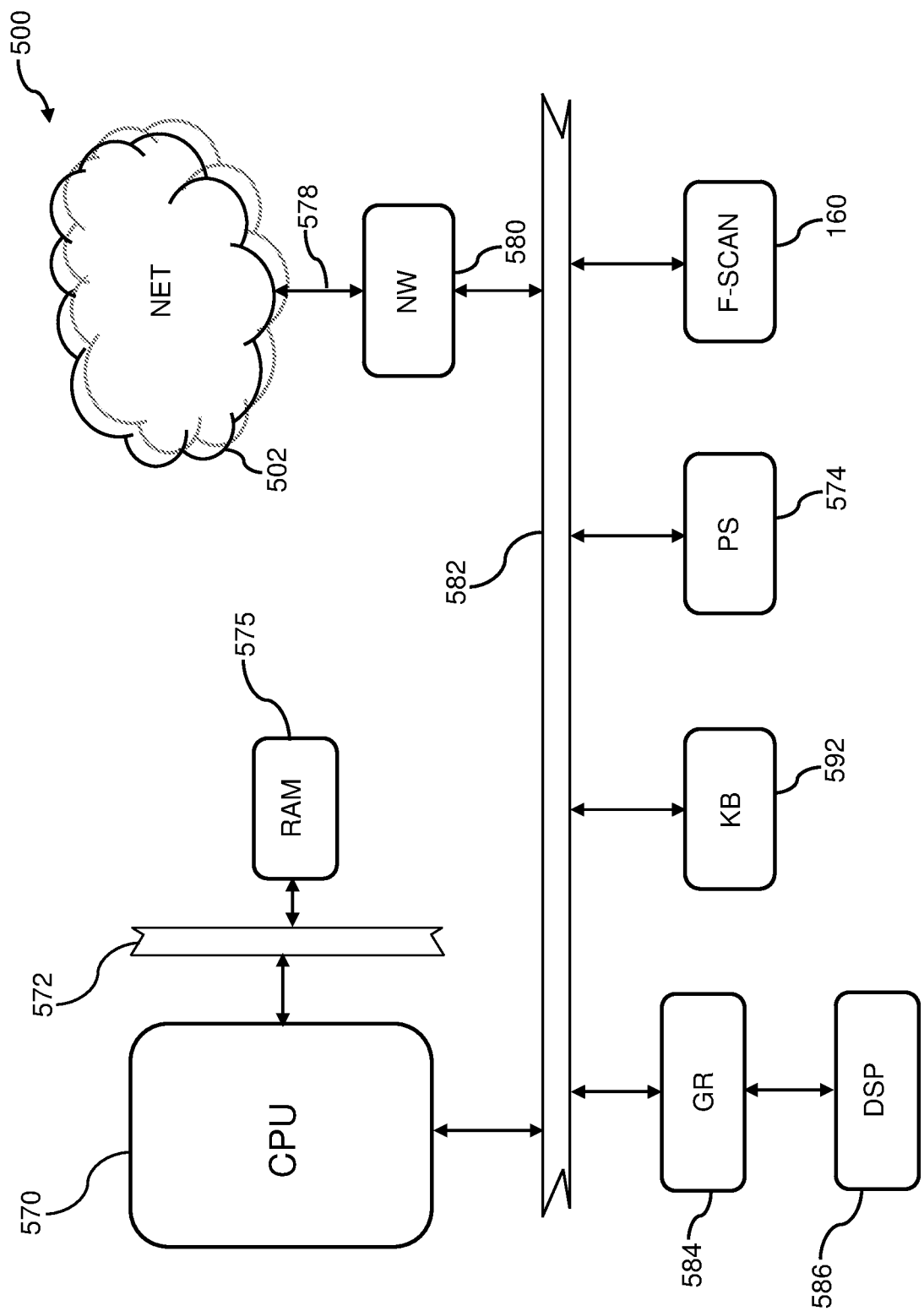
FIG. 25 illustrates a schematic diagram of the computer of the system for non-destructive testing.

Referring to FIG. 25, a schematic of a typical computer system as used by the system for non-destructive testing is shown. The example typical computer system 500 represents a typical device used as in the Referring to. This typical computer system 500 is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry. In some embodiments, the persistent memory 574 has stored therein a database of fusers (person who fuses the plastic pipes 6) and each fuse performed by a specific fuser in the database of fusers is associated with that fuser and/or the quality of the fuse is associated with that fuser. In this way, quality feedback is available for the fusers (e.g., 1% of the fuses made by a certain fuser are bad).

Also shown connected to the system bus 582 is a network interface 580 (e.g., for connecting to other computers through a network 502), a graphics adapter 584 and a keyboard interface 592 (e.g., Universal Serial Bus—USB). The graphics adapter 584 receives information from the processor 570 and controls what is depicted on a display 586 (e.g., displaying of x-ray images). The keyboard interface 592 provides navigation, data entry, and selection features. In some embodiments, the display 586 is a large screen graphics display for field view and analysis of fuses (e.g., to show and explain the issues to the fuser, etc.).

In general, some portion of the persistent memory 574 is used to store programs, executable code, data, scanned x-ray images, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. An apparatus for non-destructive testing of a fuse between a plurality of plastic pipes inserted into a fusion socket, the apparatus comprising:
   a source of radiation selectively operated to emit an x-ray radiation;
   a computer;
   a scanning plate for receiving the x-ray radiation;
   a scanner, the scanner operatively coupled to the computer;
   a display operatively coupled to the computer;
   wherein the source of radiation is positioned on one side of the fuse between the plurality of plastic pipes and the scanning plate receives the x-ray radiation that passes through the fuse while the source of radiation is selectively operated to emit the x-ray radiation; and
   wherein after the source of radiation is discontinued, the scanning plate is moved to the scanner and the scanner scans the scanning plate into an x-ray image and the x-ray image is transferred into a storage of the computer;
   wherein the computer analyzes the x-ray image of the fuse and recognizes a position of each of the plurality of plastic pipes to determine if the fuse is a good fuse or a bad fuse by the position of each of the plurality of plastic pipes.

2. The apparatus of claim 1, further comprising a lens affixed to the source of radiation, the lens is made of Beryllium and the lens allows enough radiation out of the source of radiation so as to penetrate the fuse.

3. The apparatus of claim 1, further comprising a database of fusers and each x-ray image is associated with a fuser from the database of fusers.

4. The apparatus of claim 1, wherein the plurality of plastic pipes is two plastic pipes and when the computer analyzes the x-ray image of the fuse, a bad fuse is determined when the position of a first one of the two plastic pipes is separated by a second one of the two plastic pipes by a gap that is greater than a predetermined distance.

5. The apparatus of claim 1, wherein the plurality of plastic pipes is two plastic pipes and when the computer analyzes the x-ray image of the fuse, a bad fuse is determined when the position of an end of a first one of the two plastic pipes is offset from a lengthwise center of the fusion socket by a distance that is greater than a predetermined distance.

6. The apparatus of claim 1, wherein the plurality of plastic pipes is three plastic pipes and when the computer analyzes the x-ray image of the fuse, a bad fuse is determined when the position of a first one of the three plastic pipes will impede flow of a fluid to a second one of the three plastic pipes.

7. A method of determining if a fuse between plastic pipes within a fusion socket is a bad fuse, the method comprising:
   placing a source of x-ray radiation that emits x-ray radiation on one side of the fuse;
   holding a scanning plate to an opposing side of the fuse;
   initiating emission of the x-ray radiation;
   stopping emission of the x-ray radiation;

removing the scanning plate from the opposing side of the fuse and moving the scanning plate to a scanner;

scanning the scanning plate, creating an x-ray image of the fuse;

transferring the x-ray image of the fuse into a storage of a computer;

displaying the x-ray image on a display of the computer; and visually analyzing the x-ray image of the fuse to determine if the fuse is the bad fuse by recognizing a position of each of the plastic pipes to determine if the fuse is the bad fuse by the position of each of the plastic pipes within the fusion socket.

8. The method of claim 7, further comprising inserting a lens between the source of radiation and the fuse, the lens is made of Beryllium and the lens attenuating radiation leaving the source of radiation so as to penetrate the fuse.

9. The method of claim 7, further comprising a step of associating each x-ray image with a fuser from a database of fusers.

10. The method of claim 7, wherein the plastic pipes are two plastic pipes and wherein in the step of analyzing the x-ray image of the fuse to determine if the fuse is the bad fuse includes determining that the fuse is the bad fuse when the position of a first one of the two plastic pipes is separated by a second one of the two plastic pipes by a gap that is greater than a predetermined distance.

11. The method of claim 7, wherein the plastic pipes are two plastic pipes and wherein in the step of analyzing the x-ray image of the fuse to determine if the fuse is the bad fuse includes determining that the fuse is the bad fuse when the position of an end of a first one of the two plastic pipes is offset from a lengthwise center of the fusion socket by a distance that is greater than a predetermined distance.

12. The method of claim 7, wherein the plastic pipes are three plastic pipes and wherein in the step of analyzing the x-ray image of the fuse to determine if the fuse is the bad fuse includes determining that the fuse is the bad fuse when the position of a first one of the three plastic pipes will impede flow of a fluid to a second one of the three plastic pipes.

13. A method of determining if a fuse between plastic pipes within a fusion socket is a bad fuse, the method comprising:

placing a source of x-ray radiation on one side of the fuse;
receiving the x-ray radiation at an opposing side of the fuse;
initiating emission of the x-ray radiation;
creating an x-ray image of the fuse from the radiation received at the opposing side of the fuse;
storing the x-ray image in a storage of a computer;
stopping emission of the x-ray radiation;
displaying the x-ray image on a display of the computer; and
reading the x-ray image and determining if the fuse is the bad fuse by finding, in the x-ray image, any issue of the group consisting of a gap between two of the plastic pipes being greater than a predetermined distance, an end of one of the plastic pipes being further than a second predetermined distance from a length-wise center of the fusion socket, and the end of one of the plastic pipes being inserted to far within the fusion socket, thereby blocking flow to a second one of the plastic pipes.

14. The method of claim 13, further comprising inserting a lens between the source of radiation and the fuse, the lens is made of Beryllium and the lens attenuating radiation leaving the source of radiation so as to penetrate the fuse.

15. The method of claim 13, wherein in the step of receiving the x-ray radiation an opposing side of the fuse, a scanning plate receives the x-ray radiation and in the step of creating the x-ray image of the fuse from the radiation received at the opposing side of the fuse comprises scanning the scanning plate.

16. The method of claim 13, further comprising a step of associating each x-ray image with a fuser from a database of fusers.

17. The method of claim 13, wherein the step of determining if the fuse is the bad fuse is performed by the computer, wherein the plastic pipes are two plastic pipes and wherein when a position of a first one of the two plastic pipes is separated by a second one of the two plastic pipes by a gap that is greater than the predetermined distance, the fuse is bad.

18. The method of claim 13, wherein the step of determining if the fuse is the bad fuse is performed by the computer, wherein the plastic pipes are two plastic pipes and wherein when a position of an end of a first one of the two plastic pipes is offset from a lengthwise center of the fusion socket by a distance that is greater than the second predetermined distance, the fuse is bad.

19. The method of claim 13, wherein the step of determining if the fuse is the bad fuse is performed by the computer, wherein the plastic pipes are three plastic pipes and wherein when a position of a first one of the three plastic pipes will impede flow of a fluid to a second one of the three plastic pipes, the fuse is bad.

20. The method of claim 15, further comprising a step of erasing the scanning plate.

\* \* \* \* \*